United States Patent [19]

Bourassa

[11] 3,844,177
[45] Oct. 29, 1974

[54] AXIALLY ADJUSTABLE POSITIONING MEANS

[75] Inventor: Hugh Bourassa, Cleveland, Ohio

[73] Assignee: National-Standard Company, Niles, Mich.

[22] Filed: Feb. 16, 1973

[21] Appl. No.: 333,027

[52] U.S. Cl. .......................... 74/89.15, 74/424.8 B
[51] Int. Cl. ............................................ F16h 27/02
[58] Field of Search .......... 74/89.15, 424.8, 424.8 B

[56] References Cited
UNITED STATES PATENTS
2,006,444  7/1935  Curtis ............................. 74/424.8 B
3,731,546  5/1973  MacDonald ....................... 74/89.15

FOREIGN PATENTS OR APPLICATIONS
857,203  12/1960  Great Britain ................. 74/424.8 B Primary Examiner—Samuel Scott
Assistant Examiner—Wesley S. Ratliff, Jr.
Attorney, Agent, or Firm—Johnson, Dienner, Emrich, Verbeck & Wagner

[57] ABSTRACT

An elongated shaft formed with a right-hand thread section and a left-hand thread section. First and second members have threaded engagement with the thread sections of the shaft. Rotation of the shaft normally effects axial movement of each of the members through a given distance per revolution of the shaft. Rotation and axial movement of the shaft as and when the first member abuts stop means effects axial movement of the second member through a distance twice said given distance per revolution of the shaft.

6 Claims, 6 Drawing Figures

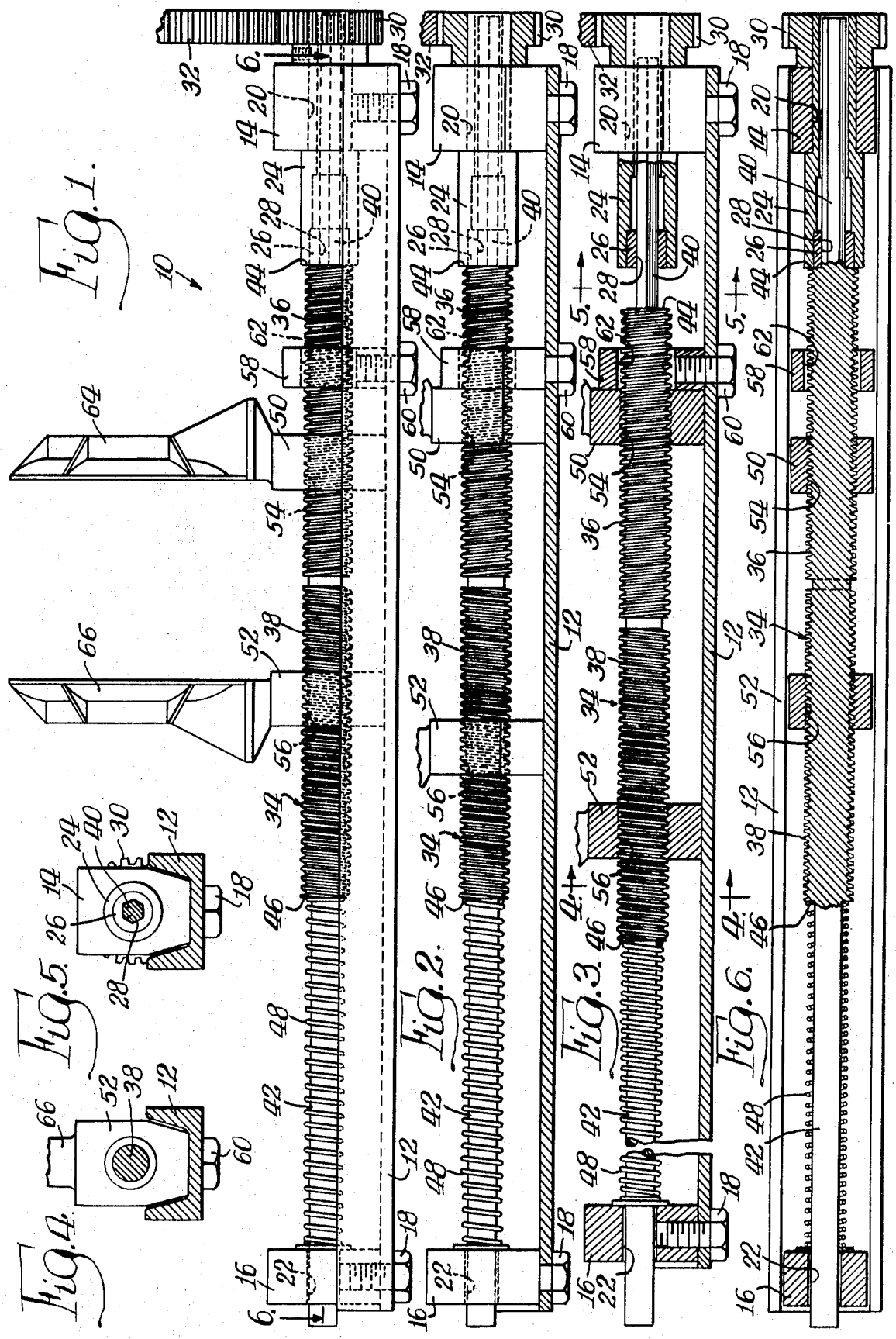

3,844,177

AXIALLY ADJUSTABLE POSITIONING MEANS

FIELD OF THE INVENTION

The present invention relates generally to axially adjustable means for positioning two relatively movable members, and is adapted for use, for example, in connection with a tire building machine for effecting movement of the end ply bag turn-up members thereof.

SUMMARY OF THE INVENTION

The axially adjustable positioning means of the present invention comprises an elongated shaft formed with a righthand thread section and a left-hand thread section and having a normal axial operating position. A first axially movable member has threaded engagement with one of the thread sections, and a second axially movable member has threaded engagement with the other of the thread sections. Support means mounts the shaft for rotation and axial movement, and stationary stop means is provided adjacent the one thread section. The shaft upon rotation when in the normal axial operating position effects movement of each of the first and second axially movable members with respect to the support means through a given distance per revolution of the shaft. Additionally, the shaft upon rotation as and when the first axially movable member abuts the stop means and as and when the shaft is thereby axially displaced from its normal axial operating position effects movement of the second axially movable member with respect to the support means through a distance twice said given distance per revolution of the shaft.

In one specific application, the first and second axially movable members are adapted to carry and move the end ply bag turn-up members of a tire building machine wherein differential stages of movement and positioning of the latter members is required or desired.

BRIEF DESCRIPTION OF THE DRAWING

FIG. 1 is a side elevational view of axially adjustable positioning means embodying the principles of the present invention, and shows the axially movable components in one operating position;

FIG. 2 is a view corresponding generally to FIG. 1, but with portions of the axially adjustable positioning means being broken away, and shows the axially movable components in a different operating position;

FIG. 3 is a substantially vertical median sectional view of the axially adjustable positioning means of FIGS. 1 and 2, and shows the axially movable components in a still different operating position;

FIG. 4 is a transverse sectional view, taken substantially along the line 4—4 in FIG. 3, looking in the direction indicated by the arrows;

FIG. 5 is a transverse sectional view, taken substantially along the line 5—5 in FIG. 3, looking in the direction indicated by the arrows; and FIG. 6 is a horizontal sectional view, taken substantially along the line 6—6 in FIG. 1, looking in the direction indicated by the arrows.

DESCRIPTION OF THE PREFERRED EMBODIMENT

Referring now to FIG. 1, there is indicated generally by the reference numeral 10 axially adjustable positioning means embodying the principles of the present invention.

The axially adjustable positioning means 10 comprises stationary frame means for example in the form of an elongated frame or channel member 12 which is generally U-shaped in cross-section. A pair of first and second axially spaced stationary support members or journal blocks 14 and 16 are carried by the frame member 12 and are preferably secured therewithin adjacent the ends thereof by means of bolts 18. The first and second support members 14 and 16 are provided respectively with axial openings 20 and 22 therethrough. Rotatably mounted in the opening 20 of the first support member 14 is sleeve means for example in the form of a stepped sleeve member 24. Suitably secured in the end of the enlarged section of the sleeve member 24 is a bushing member or female component 26 which is formed with a hexagonal or other non-circular axial opening 28 therethrough. Secured on the end of the reduced section of the sleeve member 24 is a pinion 30 which has meshing engagement with a drive gear 32.

Extending lengthwise of the frame member 12 is an elongated shaft, indicated generally by the reference numeral 34, which is formed with a right-hand thread section 36, a left-hand thread section 38, a first end section or male component 40 of hexagonal or other non-circular cross-section, and a second end section 42 of circular cross-section. The junction of the two sections 36 and 40 defines a shoulder or limit means 44, while the junction of the two sections 38 and 42 defines a shoulder 46. The first shaft end section 40 is connected with the sleeve member 24 and more specifically has interfitting engagement with the bushing opening 28 of the sleeve member 24 (FIG. 5) whereby the shaft 34 is rotatable with, and axially slidable relative to, the sleeve member 24. The second shaft end section 42 is rotatably journaled in the opening 22 of the second support member 16 and is axially slidable relative thereto. In the above described arrangement of elements, the frame member 12, the first and second support members 14 and 16, and the sleeve member 24 serve as support members 14 and 16, and the sleeve member 24 serve as support means for mounting the shaft 34 for rotation and axial movement. A coil spring 48 is disposed concentrically about the second shaft end section 42 intermediate of the second support member 16 and the shoulder 46 at the left-hand thread section 38 for biasing the shaft 34 axially in the direction of the sleeve member 24.

The axially adjustable positioning means 10 further comprises a pair of first and second axially movable members 50 and 52. The first member 50 is formed with a threaded opening 54 therethrough and has threaded engagement with the right-hand thread section 36 of the shaft 34, while the second member 52 is formed with a threaded opening 56 therethrough and has threaded engagement with the left-hand thread section 38 of the shaft 34. The lower portions of the members 50 and 52 conformably fit within the frame member 12 (FIG. 4), the members 50 and 52 are axially movable but nonrotatable relative to the frame member 12, and more particularly the interior surface of the frame member 12 serves as stationary guide means which is engageable with the members 50 and 52 along the path of movement of the latter to prevent rotation thereof. Additionally, stationary stop means for example in the form of a stop member or block 58 is suitably secured, as by a bolt 60, to the frame member 12 adjacent the righthand thread section 36. The stop member 58 is provided with an axial opening 62 through which the shaft 34 extends and which accommodates both rotation and axial movement of the shaft 34 relative to the stop member 58.

The axially adjustable positioning means 10 is adapted, for example, to be incorporated in a tire building machine. In the latter application, the axially movable members 50 and 52 are arranged to carry or have connected thereto end ply bag turn-up members 64 and 66 which are shown in FIG. 1 on a greatly reduced scale relative to the various elements of the axially adjustable positioning means 10.

The normal axial operating position of the shaft 34 is shown in FIGS. 1 and 6. The shaft 34 is biased toward and located in this position by means of the spring 48 and the engagement of the shaft shoulder 44 with the end of the sleeve member 24.

When the shaft 34 is in its normal axial operating position and is rotated in one direction by the sleeve member 24, the pinion 30 and the drive gear 32, the shaft thread sections 36 and 38 effect movement of the first and second axially movable members 50 and 52 (and in turn the end ply bag turn-up members 64 and 66) toward each other, with each member 50 and 52 being moved with respect to the frame member 12 through a given distance per revolution of the shaft 34. Correspondingly, when the shaft 34 is in its normal axial operating position and is rotated in the other direction by the sleeve member 24, the pinion 30 and the drive gear 32, the shaft thread sections 36 and 38 effect movement of the first and second axially movable members 50 and 52 (and in turn the end ply bag turn-up members 64 and 66) away from each other, with each member 50 and 52 being moved with respect to the frame member 12 through said given distance per revolution of the shaft 34.

As and when the first axially movable member 50 abuts the stop member 58, and during continuous rotation of the shaft 34 in said other direction, the shaft 34 is threaded axially through the member 50 and is axially displaced to the left from the position shown in FIG. 2 toward and through the position shown in FIG. 3; and the second axially movable member 52 is moved with the shaft 34, and also is threaded along the shaft thread section 38, to the left from the position shown in FIG. 2 toward and through the position shown in FIG. 3. As a result of this composite movement of the member 52 to the left, the shaft 34 effects movement of the second axially movable member 52 (and the member 66) away from the first axially movable member 50 (and the member 64), with the member 52 being moved with respect to the frame member 12 through a distance twice said given distance per revolution of the shaft 34.

Correspondingly, when the shaft 34 is displaced from its normal axial operating position and is rotated in said one direction, the shaft 34 is threaded axially through the member 50 and is axially moved to the right from and through the position shown in FIG. 3 to the position shown in FIG. 2; and the second axially movable member 52 is moved with the shaft 34, and also is threaded along the shaft thread section 38, to the right from and through the position shown in FIG. 3 to the position shown in FIG. 2. As a result of this composite movement of the member 52 to the right, the shaft 34 effects movement of the second axially movable member 52 (and the member 66) toward the first axially movable member 50 (and the member 64), with the member 52 being moved with respect to the frame member 12 through a distance twice said given distance per revolution of the shaft 34. In this connection, the spring 48, acting through the shaft 34, serves to maintain the first axially movable member 50 in abutting engagement with the stop member 58 until the shaft shoulder 44 is again engaged with the end of the sleeve member 24 and the shaft 34 is returned to its normal axial operating position.

The axially adjustable positioning means 10 provides two different stages of movement and positioning of the members 50 and 52: in one stage, the members 50 and 52 are each moved said given distance per revolution of the shaft 34; in the other stage, the member 50 is maintained stationary, while the member 52 is moved twice said given distance per revolution of the shaft 34. The positioning means 10 is adapted for use in an environment wherein differential positioning of members is required or desired, and may, as mentioned by way of example, be associated with the end ply bag turn-up members of a tire building machine.

While there has been shown and described a preferred embodiment of the present invention, it will be understood by those skilled in the art that various rearrangements and modifications may be made therein without departing from the spirit and scope of the invention.

The invention claimed is:

1. Axially adjustable positioning means comprising an elongated shaft formed with a right-hand thread section and a left-hand thread section and having a normal axial operating position, support means mounting said shaft for rotation and axial movement, biasing means for biasing said shaft axially to said normal axial operating position, a first axially movable member having threaded engagement with one of said thread sections, a second axially movable member having threaded engagement with the other of said thread sections, stationary stop means adjacent said one thread section, said shaft upon rotation when in said normal axial operating position effecting movement in opposite directions of each of said first and second axially movable members with respect to said support means through a given distance per revolution of said shaft, and said shaft upon rotation as and when said first axially movable member abuts said stop means and as and when said shaft is thereby axially displaced from said normal axial operating position effecting movement of said second axially movable member with respect to said support means through a distance twice said given distance per revolution of said shaft.

2. The axially adjustable positioning means of claim 1 wherein said support means comprises stationary frame means, first and second axially spaced stationary support members carried by said frame means, and sleeve means rotatably mounted in said first support member; and wherein one end of said shaft has connection with said sleeve means whereby said shaft is rotatable with and axially slidable relative to said sleeve means, and the other end of said shaft is rotatably supported and axially slidable in said second support member.

3. The axially adjustable positioning means of claim 2 including limit means on said shaft and engageable with said sleeve means for locating said shaft in said normal axial operating position.

4. The axially adjustable positioning means of claim 3 wherein said biasing means biases said shaft axially in the direction of said sleeve means.

5. The axially adjustable positioning means of claim 4 wherein said connection between said one end of said shaft and said sleeve means comprises axially extending interfitting non-circular male and female components.

6. The axially adjustable positioning means of claim 5 wherein said frame means includes stationary guide means engageable with said first and second axially movable members along the path of movement of the latter to prevent rotation thereof.

* * * * *